(12) United States Patent
Leonardi et al.

(10) Patent No.: US 6,550,504 B1
(45) Date of Patent: Apr. 22, 2003

(54) STUMP GRINDING WHEEL

(75) Inventors: Joseph A. Leonardi, Auburn, NY (US); Bruce C. Jordan, Auburn, NY (US)

(73) Assignee: Leonardi Manufacturing Company, Inc., Weedsport, NY (US)

(*) Notice: Subject to any disclaimer, the term of this patent is extended or adjusted under 35 U.S.C. 154(b) by 0 days.

(21) Appl. No.: 09/706,032

(22) Filed: Nov. 3, 2000

(51) Int. Cl.[7] .............................................. A01G 23/06
(52) U.S. Cl. ...................... 144/334; 37/302; 144/24.12; 144/218; 144/235; 144/231; 83/847; 83/848
(58) Field of Search .................... 37/302; 144/24.12, 144/218, 235, 241, 334, 231; 83/847, 848

(56) References Cited

U.S. PATENT DOCUMENTS

| | | | | |
|---|---|---|---|---|
| 3,570,566 A | * | 3/1971 | McCreery | 144/24.12 |
| 3,831,484 A | * | 8/1974 | Gibb | 144/218 |
| 4,454,901 A | * | 6/1984 | Thorsness | 144/218 |
| 5,279,345 A | * | 1/1994 | LeMaux et al. | 144/24.12 |
| 5,365,986 A | * | 11/1994 | Hooser | 144/235 |

* cited by examiner

Primary Examiner—W. Donald Bray
(74) Attorney, Agent, or Firm—George R. McGuire; Hancock & Estabrook, LLP

(57) ABSTRACT

The present invention contemplates a stump grinding wheel that provides a user of a stump grinder with visual access through the wheel. The wheel comprises first and second opposing surfaces joined by a common edge. The edge is shaped in the form of a polygon and includes several intermittently spaced apart gaps positioned between successively positioned extensions that protrude radially outwardly from the first and second surfaces. The wheel further comprises a first, conventional, centrally positioned hole formed through the first and second surfaces for coupling the wheel to a motor; a second set of holes for permitting cutting teeth to be mounted to the wheel; and a third set of holes formed through the first and second surfaces and positioned between the first hole and second set of holes. The third set of holes provides an additional window through which a user may visually inspect a stump while it is being machined.

7 Claims, 5 Drawing Sheets

STUMP GRINDING WHEEL

BACKGROUND OF THE INVENTION

The present invention relates generally to stump grinding equipment, and more particularly to stump grinding wheels to which stump grinding teeth are attached.

In the removal of tree stumps, it is well known to those skilled in the art that a grinding device including a large, circularly shaped cutting wheel or disc is coupled to a drive motor for rotation about a central axis of the wheel. A plurality of cutting teeth are securely mounted around the periphery of the cutting wheel in complimentary pairs with the cutting bit extending radially outwardly from the edge of the wheel.

In operation, the cutting tooth bearing wheel is rotated about its central axis and brought into contact with a tree stump, thereby causing the cutting teeth mounted to the wheel to cut or chip away the stump material. The user typically stands to the side of the grinding unit and continuously sweeps the cutting wheel back and forth across the stump, thus causing the cutting teeth to continuously remove the stump material. While this operation works quite well, due to the solid, circular shape of the cutting wheel, it is oftentimes necessary for the user to stop and look at the stump to see the progress being made and to ensure that nothing will obscure the path of the grinder unit as the stump is continually removed. This, of course, increases the time in which a stump can be removed.

It is therefore a principal object and advantage of the present invention to provide a cutting wheel for a stump grinding unit that does not obscure a user's view of the stump during the cutting operation.

It is a further object and advantages of the present invention to provide a cutting wheel for a stump grinding unit that facilitates faster removal of a stump relative to the state of the art.

It is a further object and advantage of the present invention to provide a cutting wheel for a stump grinding unit that decreases the amount of chip build up on the stump grinding teeth.

Other objects and advantages of the present invention will in part be obvious, and in part appear hereinafter.

SUMMARY OF THE INVENTION

In accordance with the objects and advantages set forth herinabove, the present invention provides a cutting wheel for use on a stump grinder that includes several elongated, oval shaped holes formed through the body thereof, and a peripheral edge that includes periodic gaps formed therein in order to provide a user standing to the side of the stump grinding unit with visual access of the opposite side of the cutting wheel. The cutting wheel of the present invention includes a central axis about which it rotates and complimentary pairs of conventional tooth mounting holes formed therethrough about its peripheral edge. However, the shape of the cutting wheel is polygonal, as opposed to circular, and several oval shaped holes are formed through its body. The polygonal shape of the cutting wheel permits a user of the stump grinder unit to which it is attached with visual access of the stump being machined during the machining process. This visual access is augmented by the oval shaped holes formed through the wheel's body which provide essentially continuous viewing therethrough while the wheel is in motion.

BRIEF DESCRIPTION OF THE DRAWING FIGURES

The present invention will be further understood and appreciated by reading the following Detailed Description in conjunction with the accompanying drawing figures, in which:

FIG. 1a is a top plan view thereof;

DETAILED DESCRIPTION

Figure 1:
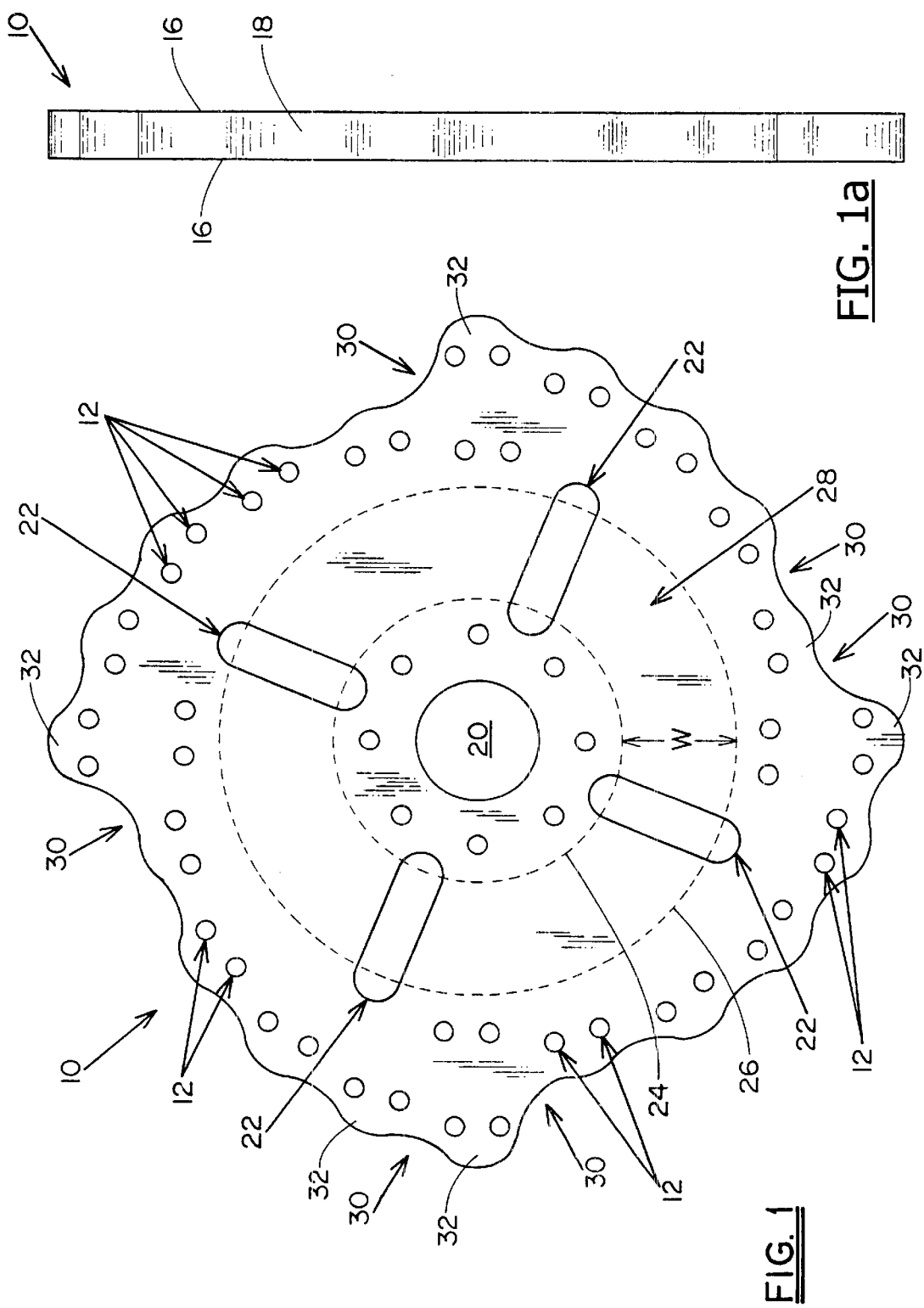
FIG. 1 is a side elevational view of a first embodiment of a cutting wheel of the present invention.
Figure 2:
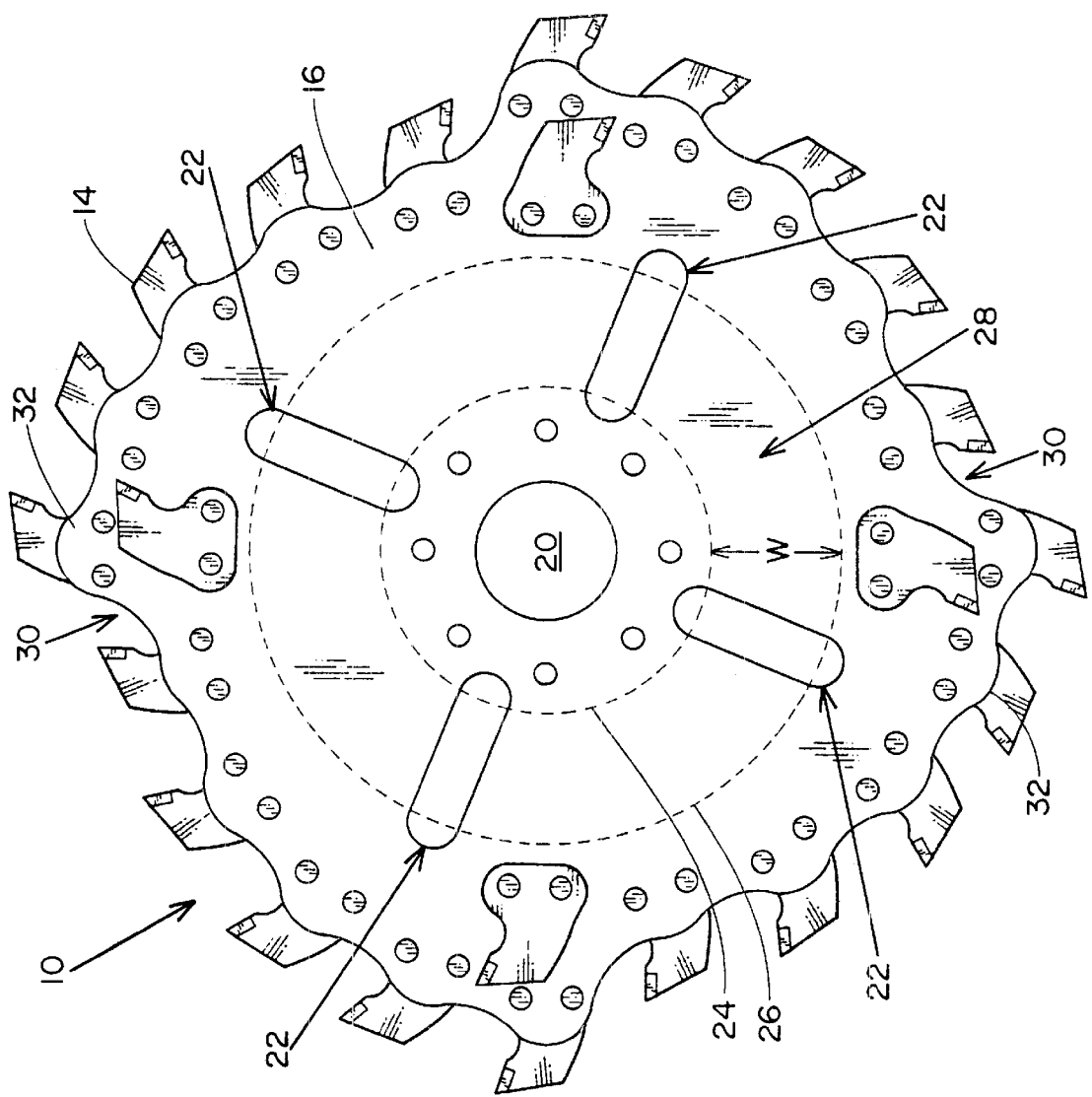
FIG. 2 is a side elevational view of the cutting wheel of FIG. 1 with cutting teeth mounted thereto.

Referring now to the drawings, wherein like reference numeral refer to like parts throughout, there is seen in FIGS. 1 and 2 a stump grinder cutting wheel, designated generally by reference numeral 10, having a plurality of holes 12 formed therethrough for permitting cutting teeth 14 (FIG. 2 only) to be mounted thereto. Wheel 10 includes opposing planar surfaces 16 defined by a peripheral edge 18, and a central opening 20 formed therethrough at which position wheel 10 is operably coupled to a conventional stump grinding unit (not shown).

Wheel 10 further comprises several elongated, generally oval shaped holes 22 formed through surfaces 16 and which are positioned between hole 20 and holes 12. Although wheel 10 is illustrated as including a set of four holes 22 that are elongated and oval in shape, there is no specified number of holes that are known to be preferred (i.e, depending on the size and shape of holes 22, it is possible that a single hole would effectively serve the function of the four holes 22 that are actually illustrated), nor is it required that the holes 22 be elongated or oval (i.e., circular, square, or other shaped holes would work as well). Holes 22 are arranged through surfaces 16 such that each one lies on the circumference of a pair of circles as illustrated by dotted lines 24, 26. The purpose of positioning holes 22 in this manner is to effect a viewing window 28 having a width W that is equal to the space between circles 24 and 26. As wheel 10 rotates at a predetermined rate about its central axis, the consequential rotation of holes 22 effectively forms window 28, thereby permitting a user to view the stump being machined therethrough. Of course, the continuity of window 28, i.e., the clarity with which a user can view a stump through window 28 is dictated by the rate of speed at which wheel 10 is being rotated (i.e., the faster wheel 10 is rotated, the clearer window 28 becomes).

In addition to holes 22, the peripheral shape of wheel 10 also permits a user to view a stump that is being machined while performing the operation. Edge 18 includes a series of gaps 30 intermittently formed between successive extensions 32 protruding radially from surfaces 16. The gaps 30 create an additional window through which a user may view a stump while performing a cutting operation.

Figure 3:
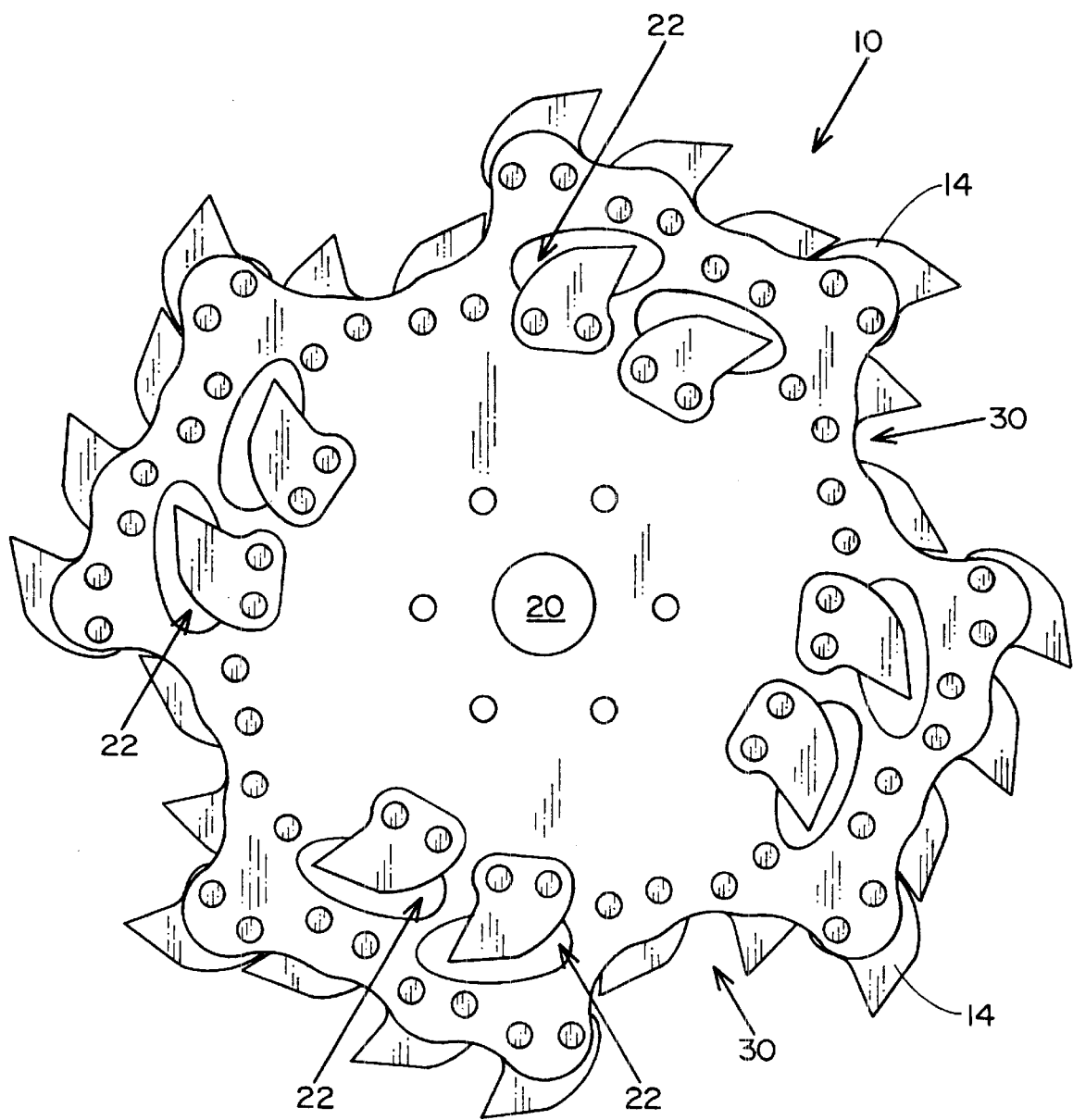
FIG. 3 is a side elevational view of a second embodiment of a cutting wheel of the present invention with cutting teeth mounted thereto.
Figure 4:
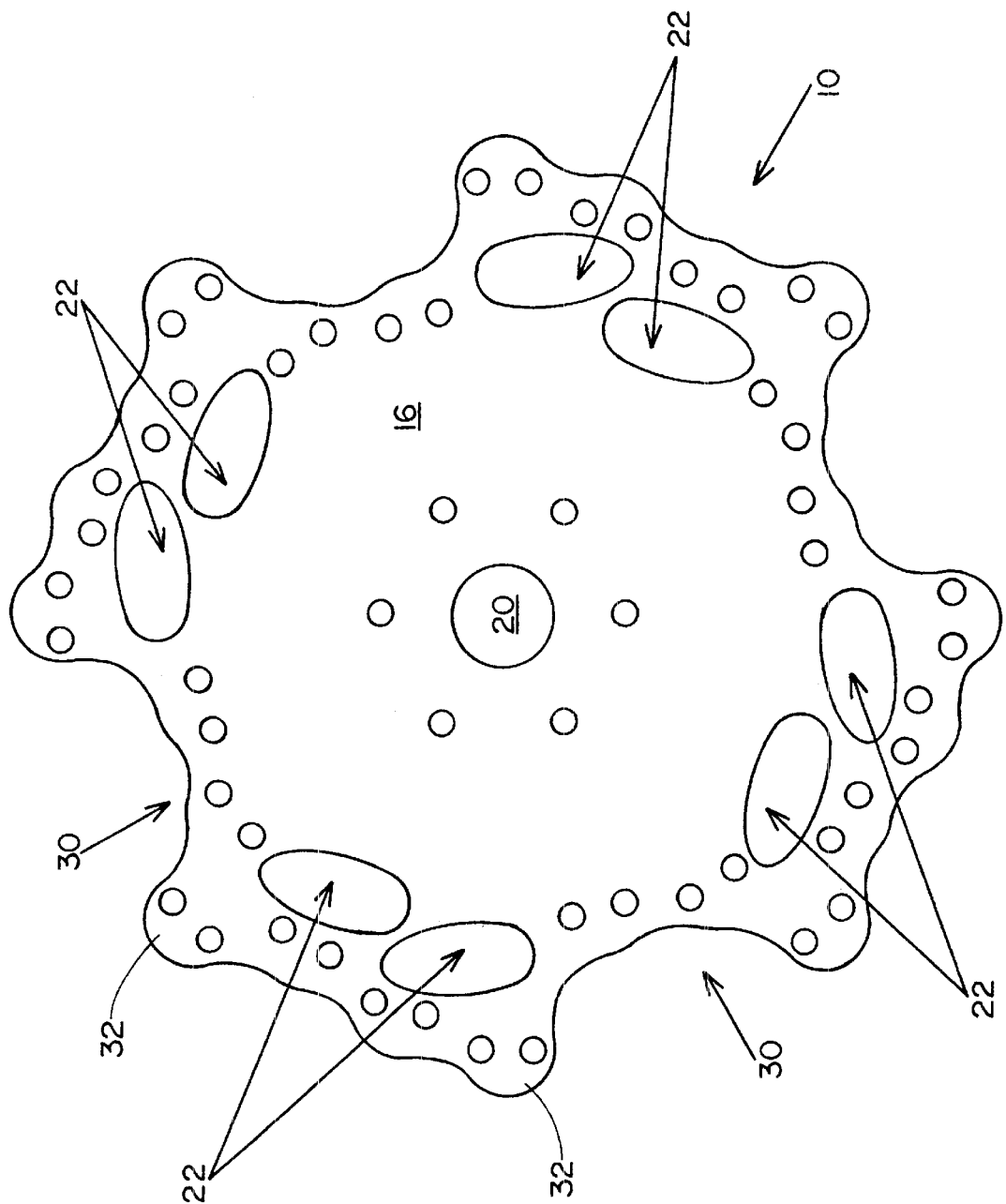
FIG. 4 is a side elevational view of a third embodiment of a cutting wheel of the present invention without cutting teeth being shown.
Figure 5:
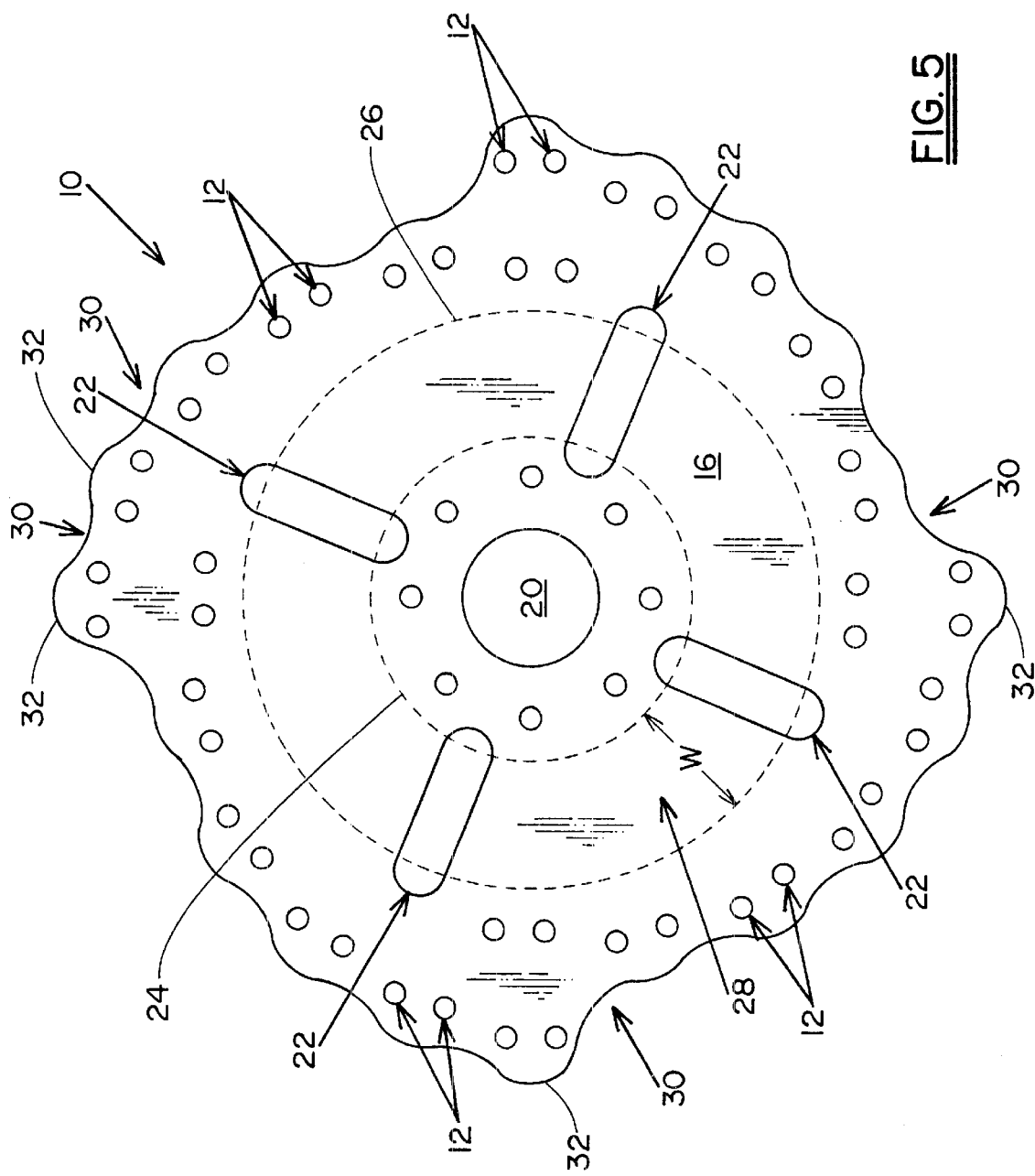
FIG. 5 is a side elevational view of a fourth embodiment of a cutting wheel of the present invention without cutting teeth being shown.

With reference to FIGS. 3–5, various shaped wheels 10 are illustrated. Each wheel 10, however, contains the same structural qualities as wheel 10 illustrated in FIGS. 1 and 2, but with slightly varied peripheral shapes. Of course, other variations to the peripheral shape of wheel 10 could be practiced without departing from the scope and spirit of the present invention as defined in the appended claims.

What is claimed is:

1. A stump grinding wheel of the type that is coupled to a stump grinding apparatus for rotation at a predetermined rate of speed and carrying a plurality of stump grinding teeth thereon, said stump grinding wheel comprising first and second opposing surfaces having a first hole formed centrally therethrough, a plurality of second holes formed through said first and second surfaces, each of said plurality of second holes partially defining the means for carrying the stump grinding teeth, and a plurality of third holes formed through said first and second surfaces, each of said plurality of third holes extending in circumferentially spaced relation to the others, whereby said plurality of third holes define a viewing window when the stump grinding wheel is rotated at a predetermined rate of speed.

2. The stump grinding wheel of claim 1, further comprising an edge that defines the periphery of said wheel.

3. The stump grinding wheel of claim 2, wherein said edge is polygonal in shape.

4. A stump grinding wheel of the type that is coupled to a stump grinding apparatus for rotation at a predetermined rate of speed and carrying a plurality of stump grinding teeth thereon, said stump grinding wheel comprising:

a. first and second opposing surfaces having a first hole formed centrally therethrough, and a plurality of second holes formed through said first and second surfaces, each of said plurality of second holes partially defining the means for carrying the stump grinding teeth; and b. means defining a viewing window through said first and second surfaces when said stump grinding wheel is rotated at the predetermined rate of speed.

5. The stump grinding wheel of claim 4, wherein said means defining a viewing window comprise at least one third hole formed through said first and second surfaces.

6. The stump grinding wheel of claim 4, wherein said means defining a viewing window comprise a plurality of holes formed through said first and second surfaces, each of said third plurality of holes extending in circumferentially spaced relation to the others.

7. A method for grinding a stump using a stump grinding unit of the type that includes a stump grinding wheel mounted thereto for rotation about its central axis at predetermined rates of speed and includes a series of openings formed therethrough that extend in circumferentially spaced relation to each other around the wheel and define a viewing window when the wheel is rotated at a predetermined speed, said method comprising the steps of:

a. causing said wheel to rotate about its central axis at a predetermined rate of speed;

b. sweeping said wheel in a back and forth motion across the stump; and c. viewing the stump as it is being ground through the viewing window created by the series of circumferentially spaced holes.

\* \* \* \* \*